United States Patent [19]

Jennings

[11] 3,946,541
[45] Mar. 30, 1976

[54] METHOD OF PICKING UP CORN
[76] Inventor: James H. Jennings, Rte. 1, Box 84, Muleshoe, Tex. 79347
[22] Filed: Dec. 17, 1974
[21] Appl. No.: 535,956

Related U.S. Application Data
[62] Division of Ser. No. 354,382, April 25, 1973, Pat. No. 3,863,430.

[52] U.S. Cl. ..................................................... 56/1
[51] Int. Cl.² ........................................ A01D 51/00
[58] Field of Search ............ 56/328 R, 364, 327 R, 1

[56] References Cited
UNITED STATES PATENTS

| | | | |
|---|---|---|---|
| 1,267,778 | 5/1918 | Leen | 56/327 R |
| 1,723,462 | 8/1929 | Boettcher | 56/364 X |
| 1,907,467 | 5/1933 | Teryo et al. | 56/328 R |
| 2,508,454 | 5/1950 | Goodwin | 56/328 R |
| 2,515,966 | 7/1950 | Polisena | 56/328 R X |
| 2,756,557 | 7/1956 | Bornzin et al. | 56/364 |
| 3,107,475 | 10/1963 | Gustafson | 56/328 R |
| 3,125,845 | 3/1964 | Lee | 56/364 |
| 3,236,038 | 2/1966 | Gates et al. | 56/364 |
| 3,286,774 | 11/1966 | Lorenzen et al. | 56/327 R |

Primary Examiner—Russell R. Kinsey
Attorney, Agent, or Firm—Clarence A. O'Brien; Harvey B. Jacobson

[57] ABSTRACT

A gathering machine having a frame, a support rotatably mounted on the frame, and picking fingers mounted on the support for rotation with same and arranged for flexing while moving against a surface and under an article lying on the surface. The fingers are parts of picking finger units having a pair of coil sections forming torsion springs connected together and provided with extending resilient elements terminating in hooks forming flexible article-picking tops. Brushes rotatably mounted on the frame guide ears of corn, and the like, into a water furrow or other path of movement of the machine to facilitate the picking operation.

2 Claims, 7 Drawing Figures

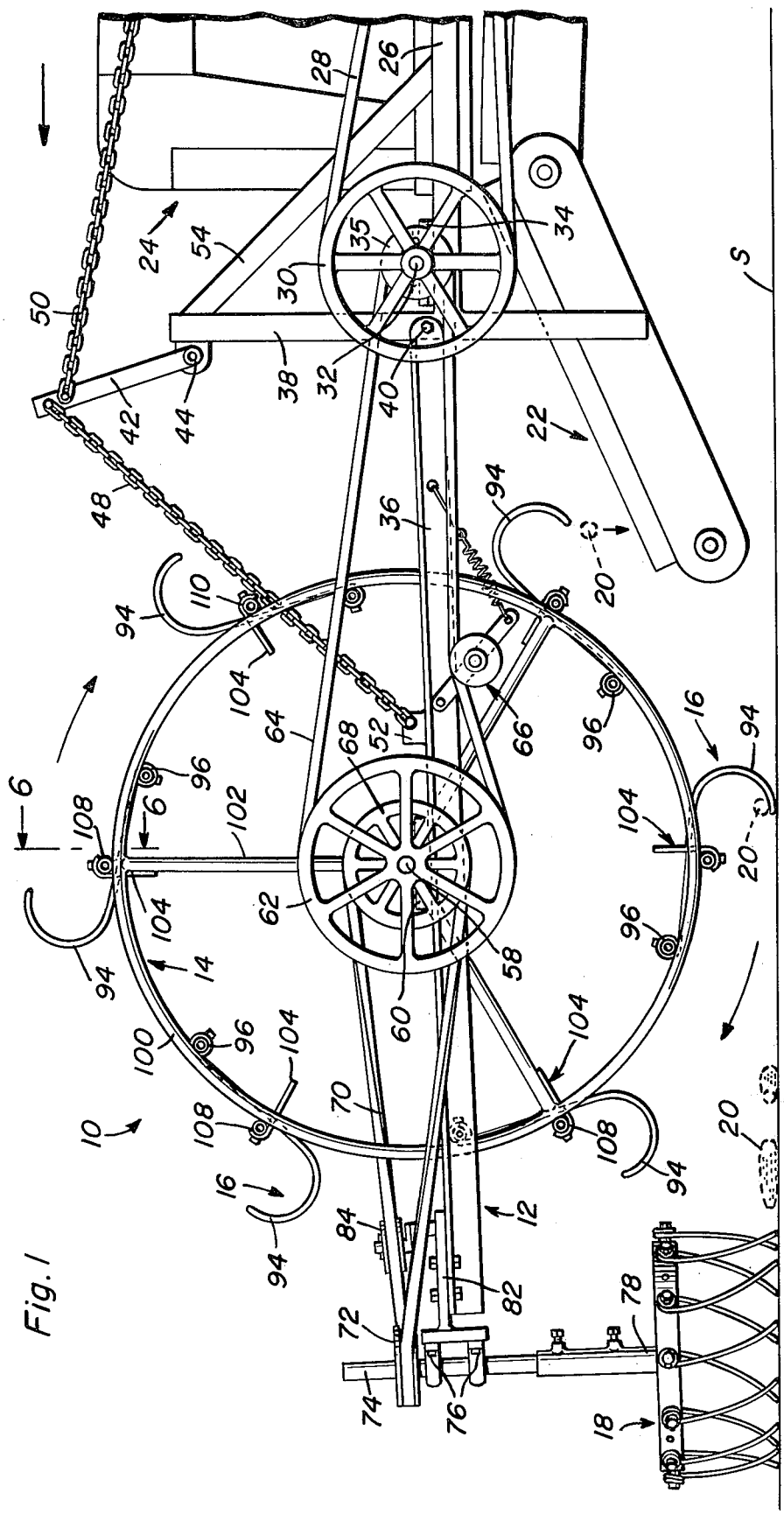

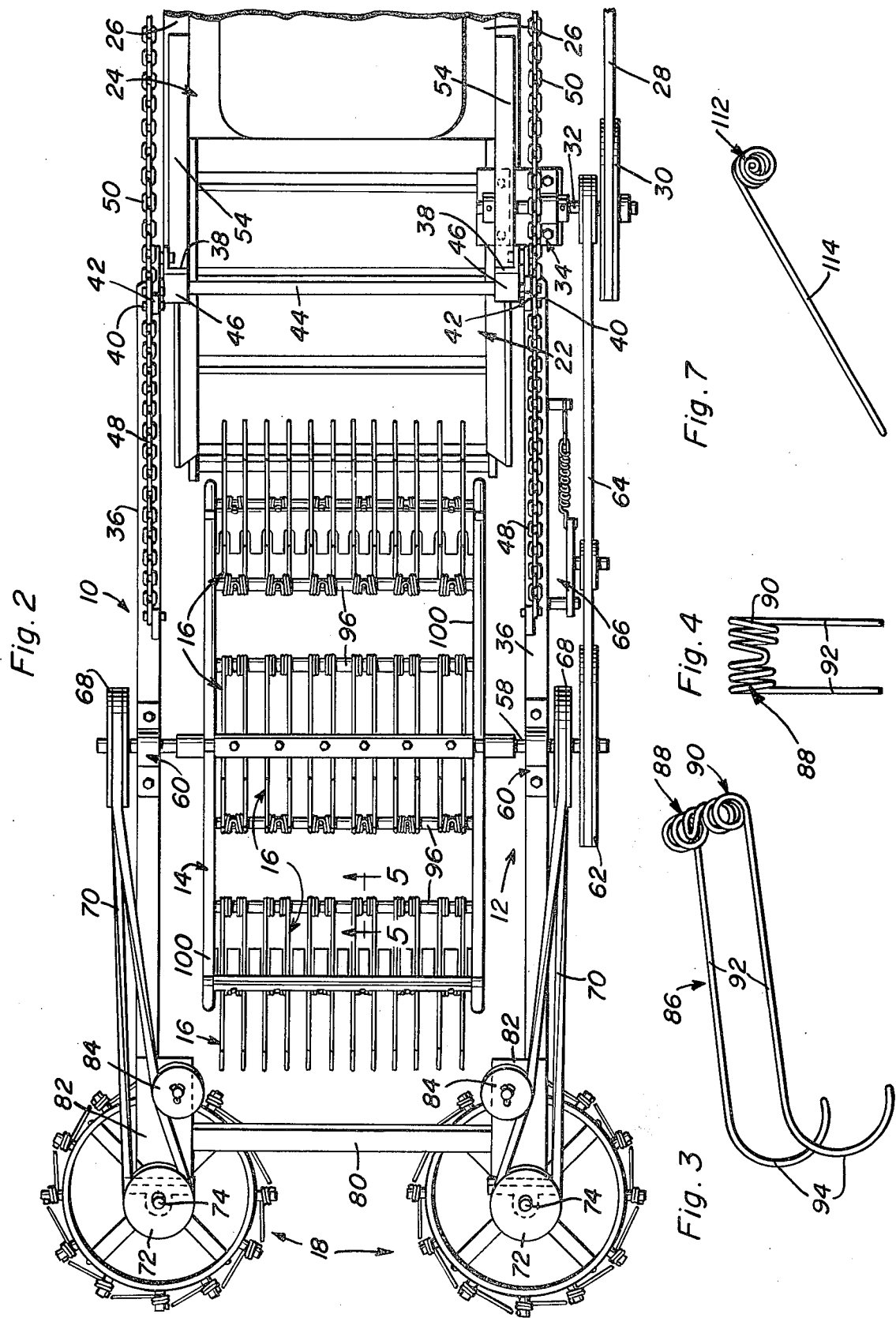

METHOD OF PICKING UP CORN

This is a division of application Ser. No. 354,382, filed Apr. 25, 1973 and now U.S. Pat. No. 3,863,430.

BACKGROUND OF THE INVENTION

1. Field of the Invention

This invention relates generally to gathering apparatus, and particularly to a device for picking-up ears of corn, and the like, lying on a supporting surface such as soil in a field.

2. Description of the Prior Art

When harvesting corn and similar agricultural products, items are frequently left lying loose on the ground when the usual harvesting operation is completed. While these items may be gathered by hand, such a procedure is usually too time consuming to justify the expenditure.

Devices are known that provide a plurality of hook-shaped fingers on a rotating support for picking stones, potatoes, and the like, from a field. These known pickers, however, use substantially rigid fingers that dig into and remove soil together with the item being picked, and would additionally tend to damage relatively fragile items such as ears of corn.

SUMMARY OF THE INVENTION

It is an object of the present invention to provide a labor-saving gathering machine especially suited for picking-up ears of corn, and the like, lying on the ground.

It is another object of the present invention to provide a picking finger unit able to move over the surface of the ground with a minimum of digging into same, while passing under an article to be picked-up.

It is yet another object of the present invention to provide a device capable of picking-up ears of corn, and the like, lying on the ground, that is mountable on a conventional farm tractor and the like, for being moved along a predetermined path of movement.

These and other objects are achieved according to the present invention by providing apparatus having: a frame, a support rotatably mounted on the frame; and at least one resilient element having a hook forming a flexible cup arranged for picking up an article lying on the ground mounted on the support for rotation with same. Advantageously, resilient brushes are provided for guiding the articles into a path of movement of the apparatus.

The resilient elements are preferably part of picking finger units each having a pair of coil sections connected together to form a torsion spring and including the resilient elements arranged extending from the coil sections. The hooks, which terminate the cantilever-mounted resilient elements, permit a picking finger being moved relative to the ground at the level of same to flex against the ground and under an article lying thereon. These articles may have been initially guided into the path of movement of the picking finger, or fingers, by resilient brushes as referred to above.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, partially schematic, side elevational view showing a gathering machine according to the present invention.

FIG. 2 is a fragmentary, partially schematic, top plan view showing the gathering machine of FIG. 1.

FIG. 3 is a perspective view showing in detail a picking finger unit according to the present invention.

FIG. 4 is a fragmentary, top plan view showing a portion of the picking finger unit of FIG. 3.

FIG. 5 is a fragmentary, sectional view taken generally along the line 5—5 of FIG. 2, and drawn to a larger scale.

FIG. 6 is a fragmentary, sectional view taken generally along the line 6—6 of FIG. 1, and drawn to a larger scale.

FIG. 7 is a perspective view showing a resilient brush element according to the present invention.

DESCRIPTION OF THE PREFERRED EMBODIMENTS

FIGS. 1 and 2 of the drawings show a gathering machine 10 according to the present invention. The specific apparatus illustrated in these figures is a one row corn pick-up version, and it is to be understood that parallel duplication of the parts to be described below would result in a device capable of covering several rows simultaneously. Machine 10 is particularly intended to be cantilever-mounted to the, for example, front end of a conventional vehicle in a manner to be set out below. Desirably, machine 10 could be connected directly to a combine or dump trailer for feeding items directly into same. The combine or dump trailer are conventional in nature, and therefore will be neither shown nor described herein.

Machine 10 has a frame 12, a support 14 rotatably mounted on frame 12, and picking fingers 16 mounted on support 14 for rotation therewith. A pair of brush assemblies 18 are arranged on frame 12 in advance of fingers 16 in the direction of motion of frame 12, indicated by the motion arrow in FIG. 1, for guiding ears of corn 20, and the like, into the direct path of picking fingers 16. The ground or other surface on which the articles are lying is designated by the letter "S" in FIG. 1 of the drawings.

A, for example, conventional slat conveyor 22 is arranged for receiving articles from picking fingers 16 and transporting same to an ultimate destination (not shown). Machine 10 and conveyor 22 are both arranged on the front end of a conventional farm tractor 24, although it is to be understood that other conventional vehicles may be substituted for tractor 24 as desired, as by a pair of longitudinal rails 26 arranged on the tractor in a known manner.

A belt 28 is arranged on a pulley 30 for transmitting power to same from tractor 24 or other suitable source. Pulley 30 is mounted on a jackshaft 32 rotatably arranged in a pillow block bearing assembly 34. All of these parts may be of conventional construction. A smaller pulley 35 is also mounted on shaft 32 for rotation therewith for transmitting power to machine 10.

Frame 12 includes a pair of side rails 36 pivotally mounted to a pair of cooperating vertical members 38 as by conventional bolts 40, and the like. Lift arms 42 are pivotally connected to vertical members 38, which are in turn connected to the ends of rails 26, as by shafts 44 journalled in lugs 46. Conventional chains 48 and 50 are arranged to provide proper vertical adjustment of frame 12 with respect to surface "S" and tractor 24. Chains 48 are attached to frame 12 as by brackets 52 mounted on rails 36, while chains 50 may be connected to a conventional winch (not shown) or other suitable device. Braces 54 provide rigidity to vertical members 36.

A shaft 58 rotatably mounted in conventional pillow block bearing assembly 60 has mounted on it a pulley 62 which is rotated by pulley 35 as through a conventional belt 64. Rotation of pulley 62 rotates shaft 58 to supply power to brush assemblies 18 in a manner to be discussed below. A conventional take-up assembly 66 is provided on a side rail 36 to provide for proper tensioning of belt 64.

A pair of pulleys 68 mounted on shaft 58 for rotation therewith transmit, by means of conventional belts 70, power to pulleys 72 for rotating same. These pulleys 72 are affixed to shafts 74 rotatably mounted in bearing holder brackets 76 for attachment of brush assemblies 18 thereto. Each brush assembly 18 has a wheel assembly 78 to which are attached brush elements to be described below. An end rail 80 connected to and extending between side rails 36 completes the basic structure of frame 12. A pair of plates 82 are arranged in the corners where end rail 80 meets rails 36, and is attached to these rails in a conventional manner. Idler pulleys 84 are mounted on plates 82 for engaging belts 70 and maintaining them in a desired state of tension for efficient operation.

Referring now to FIGS. 3 to 5 of the drawings, picking fingers 16 are formed by a plurality of picking finger units 86. Each of these units has a plurality of coils arranged in sections 88 and 90 for forming a torsion spring. Each section 88, 90 is provided with an end arranged adjoining and connected to the similar end of the other section 90, 88, and an end spaced from the other section. A pair of resilient arm elements 92 provided with hooks 94 are provided on the units, with an element 92 connected to a respective spaced end of coil sections 88, 90. Hooks 94 terminate elements 92 and form, together with the latter, J-shaped hook members, the hooks 94 are arranged extending away from these elements in a direction opposite to a direction of extension of the coil sections 88, 90 from elements 92. Coil sections 88 and 90 are arranged about longitudinal bars 96 forming part of support 14, and are secured on these bars in a conventional manner as by bolts 98.

Support 14 is formed by, in addition to bars 96, a pair of parallel, spaced rims 100 attached to shaft 58 as by spokes 102 to be rotated by that shaft. Bars 96 are affixed to and extend between rims 100. As can best be seen from FIG. 6 of the drawings, a plate 104 is also mounted on rims 100 for maintaining a predetermined spacing of elements 92. This plate 104 has a curved lip 106 which facilitates mounting of plate 104 on rods 108 which like bars 96 are affixed to and extend between rims 100. The planar portion of plate 104 is provided with a plurality of slots 110 which receive elements 92 and hold them in a predetermined position.

FIG. 7 of the drawings shows a preferred resilient element for use with brush assemblies 18. This element is essentially a wire spring provided with a coiled section 112 and a shaft 114 extending from section 112. The latter may be mounted on pins provided on wheel assembly 78 in a conventional manner as by a bolt and the like.

As can be readily understood from the above description and from the drawings, a machine 10 can be mounted on a suitable vehicle and passed along rows in a field which may have been, for example, previously harvested of corn. Those ears of corn 20 remaining on the field will be engaged by the resilient, spring-like shafts 114 forming brush assemblies 18 and be guided into the water furrows. Picking fingers 16, which are rotating in the direction of the arrows of FIG. 1, will now engage the articles, pick them up, and deposit them on conveyor 22. Because the cups formed by hooks 94 of resilient elements 92 permit flexing of the finger units as the hooks 94 move against surface S and under an article lying on the surface, and because of the torsion spring formed by coiled sections 88 and 90, the hooks 94 will run adjacent surface S just under the articles with a minimum of digging into the, for example, soil forming surface S. The use of the spring brushes with brush assemblies 18 will also permit the articles to be moved along surface S with a minimum of digging into that surface.

Once the articles have been picked up by fingers 16, they will be rotated over the top of support 14 and deposited onto slat conveyor 22. This particular conveyor, which is located low and behind the pick-up reel formed by support 14, will allow excess dirt and trash to fall back to the ground, while the corn, and the like, can go on to a, for example, combine or dump wagon. Guide plate 104 on stop rods 108 controls the spacing of the springlike resilient elements 92. The coil sections 88 and 90 will give the finger units 86 extended life and greater flexibility. Power to support 14 and brush assemblies 18 is advantageously supplied by the propelling unit, tractor 24 in the drawings, and is not in relation to the ground speed of the propelling unit. Machine 10 is raised and lowered with relation to the vehicle on which it is mounted as by hydraulic and other suitable devices mounted on the vehicle or propelling unit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A method of picking ears of corn from the ground, comprising the steps of:
   a. supporting a plurality of elongated rows of picking fingers, including elongated arms and back-turned, semi-circular hooks at one set of ends of the arms in position relative to each other with said rows spaced about and extending longitudinally of a cylindrical area and the arms in each row of picking fingers having the other set of ends thereof supported for oscillation about an axis extending longitudinally of the cyclindrical area and the hook ends of the arms yieldingly inwardly deflectable from outermost positions with the hooks spaced about the area and opening tangentially in the same circumferential directions; and,
   b. simultaneously orbiting the axes of oscillation of the sets of picking fingers about the center axis of the cylindrical area to advance the hooks in the peripheral directions in which they open and laterally advancing said center axis over the ground at an elevation with the rows of picking fingers having the hooks thereof successively engaging the ground when disposed at the lowermost peripheral portion of said area and with the center axis being advanced in the direction in which the lowermost hooks open.

2. The method of claim 1 including the step of collecting the picked corn falling rearwardly and downwardly from the upper rear portion of the cylindrical area about which the axes of oscillation of the rows of picking fingers are orbited.

* * * * *